United States Patent
Baek et al.

(10) Patent No.: US 9,956,518 B2
(45) Date of Patent: May 1, 2018

(54) ENERGY-SAVING ACID GAS CAPTURE SYSTEM AND METHOD

(71) Applicant: KOREA INSTITUTE OF ENERGY RESEARCH, Daejeon (KR)

(72) Inventors: Il Hyun Baek, Daejeon (KR); Jong Kyun You, Daejeon (KR); Ki-Tae Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 85 days.

(21) Appl. No.: 15/101,369

(22) PCT Filed: Dec. 9, 2013

(86) PCT No.: PCT/KR2013/011326
§ 371 (c)(1),
(2) Date: Jun. 2, 2016

(87) PCT Pub. No.: WO2015/083866
PCT Pub. Date: Jun. 11, 2015

(65) Prior Publication Data
US 2016/0303505 A1    Oct. 20, 2016

(30) Foreign Application Priority Data
Dec. 4, 2013 (KR) .................. 10-2013-0149939

(51) Int. Cl.
*B01D 19/00* (2006.01)
*B01D 53/14* (2006.01)
*B01D 53/18* (2006.01)

(52) U.S. Cl.
CPC ..... *B01D 53/1456* (2013.01); *B01D 53/1425* (2013.01); *B01D 53/1468* (2013.01);
(Continued)

(58) Field of Classification Search
None
See application file for complete search history.

(56) References Cited

U.S. PATENT DOCUMENTS

| | | | | |
|---|---|---|---|---|
| 2008/0184887 A1* | 8/2008 | Mak | ............... | B01D 53/1425 95/174 |
| 2010/0229723 A1* | 9/2010 | Gelowitz | ........... | B01D 53/1425 95/162 |
| 2012/0118162 A1* | 5/2012 | Ogawa | ............... | B01D 53/1475 96/242 |

FOREIGN PATENT DOCUMENTS

| | | |
|---|---|---|
| JP | 2012-500713 A | 1/2012 |
| KR | 10-2009-0008270 A | 1/2009 |

(Continued)

OTHER PUBLICATIONS

Park, "Carbon Dioxide Capture and Storage Technology", Physics and high technology, Jun. 2009, pp. 19-23.

(Continued)

*Primary Examiner* — Amber R Orlando
*Assistant Examiner* — Phillip Y Shao
(74) *Attorney, Agent, or Firm* — Knobbe Martens Olson & Bear LLP

(57) ABSTRACT

The present invention relates to an acid gas capture system and method which can reduce the energy consumption by using the heat from the system itself of an acid gas capture system. The system and method according to the present invention causes heat exchange to occur between an absorbent discharged from the upper part of an absorption tower of the capture system and a mixed gas comprising an acid gas, and a portion of an absorbent solution which has absorbed the acid gas discharged from the lower part of the absorption tower, and additionally, the remaining absorbent solution excluding said portion thereof undergoes heat exchange with the regenerated high-temperature absorbent
(Continued)

solution discharged from the reboiler to preheat the absorbent solution supplied to the regeneration tower, thereby reducing the thermal energy required by same.

7 Claims, 2 Drawing Sheets

(52) U.S. Cl.
CPC ..... *B01D 53/1475* (2013.01); *B01D 53/1487* (2013.01); *B01D 53/1493* (2013.01); *B01D 53/185* (2013.01); *B01D 2252/103* (2013.01); *B01D 2257/304* (2013.01); *B01D 2257/306* (2013.01); *B01D 2257/308* (2013.01); *B01D 2257/504* (2013.01); *B01D 2257/7025* (2013.01); *B01D 2259/65* (2013.01); *Y02C 20/20* (2013.01)

(56) References Cited

FOREIGN PATENT DOCUMENTS

| KR | 10-2010-0092967 A | 8/2010 |
| KR | 10-0983677 B1 | 9/2010 |
| KR | 10-2012-0029523 A | 3/2012 |
| KR | 10-2013-0023484 A | 3/2013 |

OTHER PUBLICATIONS

International Search Report dated Sep. 1, 2014 of PCT/KR2013/011326 which is the parent application and its English translation—4 pages.

* cited by examiner

[Fig. 1]
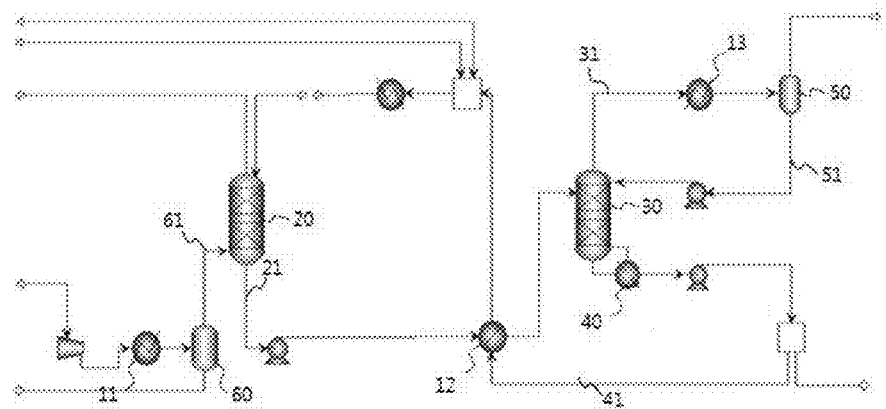

[Fig 2]
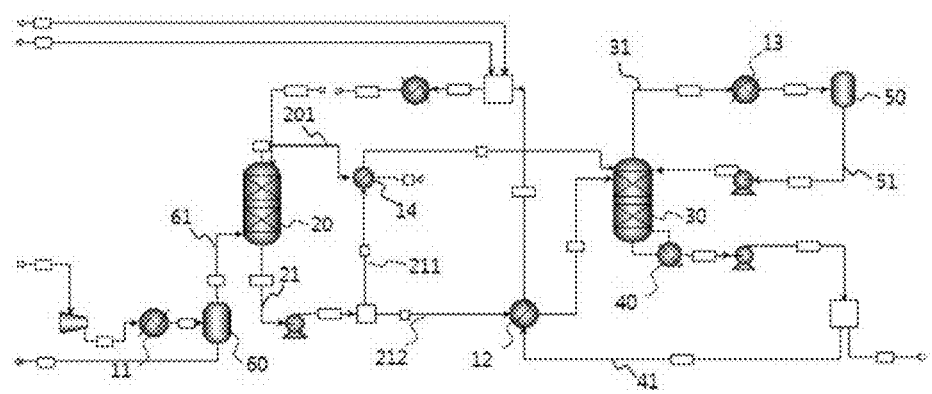

ENERGY-SAVING ACID GAS CAPTURE SYSTEM AND METHOD

TECHNICAL FIELD

The present disclosure relates to an acid gas capture system, and more particularly, to a system and method of capturing an acid gas such as carbon dioxide with reduced energy consumption using a mixed gas containing the acid gas and an absorbent discharged from an absorption tower of the acid gas capture system.

BACKGROUND ART

The concentration increase of acid gas such as carbon dioxide ($CO_2$), methane ($CH_4$), hydrogen sulfide ($H_2S$), carbonyl sulfide (COS) or the like in the air from the use of fossil fuel is causing global warming. In particular, reducing the concentration of carbon dioxide in the air has been actively discussed worldwide in various aspects since the Rio De Janeiro Environmental Conference in 1992.

Carbon dioxide capture and storage (CCS) technologies are isolating carbon dioxide discharged in large quantity from power plants, steel plants or cement plants from the air.

In particular, carbon dioxide capture in CCS technologies is considered a core technology that takes about 70% to about 80% of the overall costs, which may be classified into post-combustion technology, pre-combustion technology, and oxy-fuel combustion technology (refer to "Carbon Dioxide Capture and Storage Technology", by Sang-do Park, Physics and Advanced Technologies, June, 2009).

Post-combustion technology is isolating carbon dioxide ($CO_2$) produced from combustion of fossil fuel by absorbing or reacting the carbon dioxide ($CO_2$) with various solvents. Pre-combustion technology is capturing carbon dioxide ($CO_2$) in exhaust gas before combustion by pre-treating fossil fuel such as coal, for example, via gasification into carbon dioxide ($CO_2$) and hydrogen ($H_2$), and then isolating the carbon dioxide ($CO_2$) from the mixed gas of carbon dioxide ($CO_2$) and hydrogen ($H_2$) or combusting the mixed gas. Oxy-fuel combustion technology is combusting fossil fuel with only pure oxygen instead of air, thereby to easily capture carbon dioxide ($CO_2$). Post-combustion technology of the above-described technologies is currently most widely used.

Post-combustion technology is the most easy to apply with existing carbon dioxide sources, which separates carbon dioxide by absorbing or desorbing carbon dioxide with absorbent, focusing on performance improvement of the absorbent and process improvement therefor. This post-combustion technology includes wet absorption and dry absorption technologies that are currently in commercial use to supply carbon dioxide required for automatic welding or producing urea fertilizer or carbonated drink. Wet absorption technology may have higher efficiency than dry absorption technology.

A typical wet absorption process is a capture process using amine-based absorbent. This process has been used in a modification process involved in petrochemical processes with ensured technical reliability, but still needs further improvement in terms of absorbent performance and process improvement in order to be applicable with flue gas including various contaminants. As a process using amine-based absorbent, a chemical absorption process using an alkanolamine absorbent that includes both amine and hydroxyl groups bound to an alkyl group may be performed using a system equipped with an absorption tower for selectively absorbing carbon dioxide from inflow gas with the absorbent, a recycling tower (hot recycling tower) for processing the carbon dioxide-absorbed absorbent to regenerate the initial absorbent free of carbon dioxide for recycling, and other accessory equipments.

Monoethanolamine (MEA), as a most widely used amine-based absorbent, has alkaline properties due to unshared electrons in amine groups, which may cause acid-base neutralization reaction with acidic carbon dioxide. Furthermore, salts (carbamate or bicarbonate) as reaction products may be decomposed at a temperature of about 110° C. to about 130° C. to regenerate the absorbent. The ability to absorb carbon dioxide ($CO_2$) and the absorption rate of an absorbent may vary according to structural characteristics of amines used in the absorbent.

A carbon dioxide absorption process may be performed at about 40° C. to about 50° C., while a recycling process may be performed at about 110° C. to about 130° C. Accordingly, part of the absorbent may vaporize during the recycling process and be discharged together with carbon dioxide. In this regard, there is a need for preheating technologies to reduce the heat duty of such as a cooler and condenser for cold condensation and a reboiler in the recycling process.

Korean Patent No. 0983677 relates to a system and method of absorbing and separating acid gas, wherein using steam generated in a boiler as a heat source for recycling absorbent is disclosed. However, using the generated steam only for absorbent recycling still has limitations.

Therefore, there is a need for the development of technologies to reduce the energy consumption in heating and cooling of the recycling process.

PRIOR ART DOCUMENTS

Patent Document (0001) Korean Patent No. 0983677

Non-Patent Document (0001) "Carbon Dioxide Capture and Storage Technology", by Sang-do Park, Physics and Advanced Technologies, June, 2009

DETAILED DESCRIPTION OF THE INVENTION

Technical Problem

The present invention provides an acid gas capture system and method that may reduce the energy consumption through heat exchange using a mixed gas heat generated in the acid gas capture system.

Technical Solution

To address these drawbacks, the inventors of the present invention found that an absorbent may be effectively supplied to a recycling tower via preheating through heat exchange between a mixed gas containing the absorbent and an acid gas and an acid gas-absorbed absorbent both discharged from an absorption tower, and recovering the absorbent from the mixed gas, so that the present invention was completed.

According to an aspect of the present disclosure, an energy-saving acid gas capture system includes: an absorption tower absorbing an acid gas with an absorbent; a recycling tower isolating a processed gas from the absorbent which has absorbed the acid gas; an exhaust gas supply line that supplies an exhaust gas containing an acid gas to the absorption tower via a first heat exchanger and a water separator; an absorbent supply line that supplies the absorbent which has absorbed the acid gas in the absorption tower to the recycling tower; a processed gas discharge line that supplies a processed gas discharged from the recycling tower to a condenser via a third heat exchanger; a condensate supply line that supplies condensate water generated in the condenser for recycling; and a mixed gas discharge line that externally discharges a mixed gas containing the acid gas and the absorbent from an upper part of the absorption tower via a fourth heat exchanger, wherein the absorbent supply line includes a first absorbent supply line that supplies a portion of the absorbent which has absorbed the acid gas to a fourth heat exchanger that performs heat exchange with the mixed gas discharge line, and a second absorbent supply line that supplies the remaining portion of the absorbent which has absorbed the acid gas to the recycling tower via a second heat exchanger.

In some embodiments, the absorbent supply line for supplying the absorbent which has absorbed the acid gas may intersect with the recycled absorbent supply line that supplies a recycled absorbent to the absorption tower via a reboiler connected to a lower part of the recycling tower at the second heat exchanger.

In some embodiments, an operating temperature of the condenser may be from about 30° C. to about 40° C.

In some embodiments, the acid gas may be carbon dioxide ($CO_2$), methane ($CH_4$), hydrogen sulfide ($H_2S$), carbonyl sulfide (COS), or mercaptane (RSH, wherein R is a hydrocarbon).

According to another aspect of the present disclosure, there is provided an energy-saving acid gas capture method using an absorption tower absorbing an acid gas with an absorbent and a recycling tower isolating a processed gas from the absorbent which has absorbed the acid gas, the method including: supplying an exhaust gas containing an acid gas to the absorption tower in order to absorb the acid gas with the absorbent; supplying the absorbent which has absorbed the acid gas, discharged from the absorption tower, to the recycling tower to separate the acid gas from the absorbent; supplying a processed gas discharged from the recycling tower to a condenser to isolate condensate water from the processed gas; supplying the condensate water generated by the condenser to a condensate supply line; supplying a portion of the absorbent which has absorbed the acid gas, discharged from a lower part of the absorption tower, to the recycling tower after heat exchange with a mixed gas discharged from an upper part of the absorption tower; and supplying the remaining portion of the acid gas-absorbed absorbent to the recycling tower after heat exchange with a recycled absorbent supplied from a reboiler.

In some embodiments, an operating temperature of the condenser may be from about 30° C. to about 40° C.

In some embodiments, the acid gas may be carbon dioxide ($CO_2$), methane ($CH_4$), hydrogen sulfide ($H_2S$), carbonyl sulfide (COS), or mercaptane (RSH, wherein R is a hydrocarbon).

Advantageous Effects

As described above, according to the one or more embodiments, an acid gas capture system and method may reduce the heat duty of a reboiler by preheating an absorbent prior to its supply to a recycling tower through heat exchange between an acid gas-absorbed absorbent discharged from a lower part of an absorption tower, and a mixed gas containing the absorbent and the acid gas discharged from an upper part of the absorption tower or condensate water.

DESCRIPTION OF THE DRAWINGS

FIG. 1 illustrates a conventional acid gas capture system; and

FIG. 2 illustrates an acid gas capture system according to an embodiment of the present disclosure.

EMBODIMENTS

One or more embodiments of an acid gas capture system and method now will be described more fully hereinafter with reference to the accompanying drawings, in which illustrative embodiments of the invention are shown. However, this invention should not be construed as limited to the embodiments set forth herein, and may be embodied in many different forms without departing from the principles and spirit of the invention, the scope of which is defined in the claims and their equivalents.

In the drawings illustrating embodiments of the present invention, like numbers refer to like elements throughout, and detailed description of the same or like elements are not repeated.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Absorbent, processed gas, or condensate transport (supply or discharge) lines that may exchange heat with one another are described herein as "intersecting with each other" at a heat exchanger for heat exchanging. In other words, two of these fluid supply lines may intersect with each other in a heat exchanger for heat exchange with each other.

FIG. 1 illustrates a conventional acid gas capture system. In the conventional acid gas capture system of FIG. 1, an exhaust gas that contains an acid gas such as carbon dioxide may be supplied to an absorption tower 20 that may be filled with filling matter having a large surface area to facilitate contact between gas and liquid, to contact an absorbent in liquid state that may be sprayed above the absorption tower 20 under an atmospheric condition. The contacting between the exhaust gas and the absorbent may be performed at a temperature of about 40° C. to about 50° C., so that the acid gas such as carbon dioxide present in the exhaust gas may be absorbed into the absorbent in liquid state.

The absorbent discharged from the absorption tower 20, i.e., the absorbent which has absorbed the acid gas such as carbon dioxide (also referred to herein as "acid gas-absorbed absorbent"), may be transported to a recycling tower 30, and then thermally treated at a temperature of about 120° C. to obtain a processed gas that is free of the absorbent. Then, the processed gas free of the absorbent may be discharged through an upper part of the recycling tower 30, while the recycled absorbent free of the processed gas may be recycled by being supplied back to the absorption tower 20 via a reboiler 40. The processed gas discharged from the recycling tower 30 may be supplied to a condenser 50 via a processed gas discharge line 31. The condenser 50 may condense part of steam into water so that the steam remaining uncondensed and acid gas such as carbon dioxide may be obtained as final products. The condensate water may be supplied back to the recycling tower 30 via a condensate supply line 51 for recycling. The recycling of the condensate may improve the separation efficiency of the recycling tower 30 but may also increase the heat duty of the reboiler 40 due to the inflow of the low-temperature condensate. The recycled absorbent may be transported through a recycled absorbent supply line 41 to preheat the acid gas-absorbed absorbent that is to be supplied to the recycling tower 30 via the second heat exchanger 12, and to be supplied back to the absorption tower 20 in order to absorb newly supplied acid gas. The recycled absorbent supply line 41 may intersect with an absorbent supply line 21 at the second heat exchanger 12, wherein the absorbent supply line 21 may supply the acid gas-absorbed absorbent from the absorption tower 20 to the recycling tower 30 in the first heat exchanger 10.

FIG. 2 illustrates an acid gas capture system according to an embodiment of the present disclosure. The acid gas capture system of FIG. 2 may include an absorption tower 20 for absorbing acid gas with an absorbent and a recycling tower 30 for isolating a processed gas from the absorbent. The acid gas capture system may include an exhaust gas supply line 61 that may supply an exhaust gas containing an acid gas to the absorption tower 20 via a first heat exchanger 11 and a water separator 60; an absorbent supply line 21 that may supply the absorbent which has absorbed the acid gas (also referred to as "acid gas-absorbed absorbent") in the absorption tower 20 to the recycling tower 30; a processed gas discharge line 31 for supplying a processed gas discharged from the recycling tower 30 to a condenser 50 via a third heat exchanger 13; a condensate supply line 51 for supplying condensate water generated in the condenser 50 for recycling; and a mixed gas discharge line 201 for externally discharging a mixed gas containing the acid gas and the absorbent via a fourth heat exchanger 14. The absorbent supply line 21 may include a first absorbent supply line 211 for supplying a portion of the acid gas-absorbed absorbent to a fourth heat exchanger 14 that performs heat exchange with the mixed gas discharge line 201, and a second absorbent supply line 212 for supplying the remaining portion of the acid gas-absorbed absorbent to the recycling tower 30 via a second heat exchanger 12.

In an acid gas capture system according to an embodiment as described above, chemical binding of the absorbent and the acid gas containing carbon dioxide may take place in the absorption tower 20 so that the absorbent may absorb the acid gas. The acid gas-absorbed absorbent may be supplied to the recycling tower 30 to separate the absorbent from the acid gas for recycling the absorbent. The acid gas-absorbed absorbent supplied to the recycling tower 30 may be separated into the acid gas and the absorbent at a temperature of about 120° C. The temperature of the acid gas-absorbed absorbent in the absorption tower 20 may be about 50° C. to about 60° C., so that heat energy may be required for the isolating of the acid gas-absorbed absorbent at the recycling tower 30. To reduce such required heat energy, preheating the acid gas-absorbed absorbent may be performed prior to the supplying of the acid gas-absorbed absorbent to the recycling tower 30. Accordingly, in order to be preheated, a portion of the acid gas-absorbed absorbent may be supplied to the fourth heat exchanger 14 through the first absorbent supply line 211, and the mixed gas, including the acid gas and the absorbent, discharged from the upper portion of the absorption tower 20, may undergo heat exchange at the fourth heat exchanger 14 to recover the absorbent present as a mist in the mixed gas. The absorbent separated from the mixed gas and the remaining portion of the acid gas-absorbed absorbent may be supplied from the fourth heat exchanger 14 to the recycling tower 30, from which the acid gas may then be externally discharged.

The remaining portion of the acid gas-absorbed absorbent, except for the portion supplied to the fourth heat exchanger 14, may be supplied to the second heat exchanger 12 through the second absorbent supply line 212, and then supplied to the recycling tower 30 then to the reboiler 40 after being preheated to about 90 to 100° C. through heat exchange with a high-temperature (120° C.) recycled absorbent generated in the recycling tower 30. The absorbent separated from the acid gas in the recycling tower 30 may be supplied back to the absorption tower 20 via a reboiler 40, and discharged through a processed gas discharge line 31. Therefore, an acid gas capture system according to any of the above-described embodiments may efficiently recover the absorbent from the mixed gas by using the heat energy generated in the acid gas capture system. This may easily reduce the energy duty of the acid gas capture system itself.

In some embodiments, an operating temperature of the condenser 50 may be from about 30 to about 40° C. The acid gas may be selected from carbon dioxide ($CO_2$), methane ($CH_4$), hydrogen sulfide ($H_2S$), carbonyl sulfide (COS) or mercaptane (RSH, wherein R is hydrocarbon). However, embodiments are not limited thereto.

According to another aspect of the present disclosure, there is provided an acid gas capture method using a system including an absorption tower absorbing an acid gas with an absorbent, and a recycling tower isolating a processed gas from the absorbent which has absorbed the acid gas. The acid gas capture method may include: supplying an exhaust gas containing an acid gas to the absorption tower in order to absorb the acid gas with the absorbent; supplying the absorbent which has absorbed the acid gas, discharged from the absorption tower, to the recycling tower to separate the acid gas from the absorbent; supplying a processed gas discharged from the recycling tower to a condenser to isolate condensate water from the processed gas; supplying the condensate water generated by the condenser to a condensate supply line; supplying a portion of the absorbent which has absorbed the acid gas, discharged from a lower part of the absorption tower, to the recycling tower after heat exchange with a mixed gas discharged from an upper part of the absorption tower; and supplying the remaining portion of the acid gas-absorbed absorbent to the recycling tower after heat exchange with a recycled absorbent supplied from a reboiler.

While one or more embodiments have been described above with reference to the figures, it will be understood by those of ordinary skill in the art that various changes in form and details may be made therein without departing from the spirit and scope as defined by the following claims.

Unless otherwise defined, terms used herein have the meaning as commonly understood by one of ordinary skill in the art to which this invention pertains. All references, including publications, patent documents, and non-patent documents cited herein are incorporated herein in their entirety by reference.

LIST OF REFERENCE NUMERALS

11: first heat exchanger
12: second heat exchanger
13: third heat exchanger

14: fourth heat exchanger
20: absorption tower
21. absorbent supply line
30. recycling tower
31. processed gas discharge line
40. reboiler
41. recycled absorbent supply line
50. condenser
51. condensate supply line
60. water separator
61. exhaust gas supply line
201. mixed gas supply line
211. first absorbent supply line
212. second absorbent supply line

The invention claimed is:

1. An energy-saving acid gas capture system comprising:
   an absorption tower configured to absorb an acid gas with an absorbent;
   a recycling tower configured to isolate a processed gas from the absorbent which has absorbed the acid gas;
   an exhaust gas supply line configured to supply an exhaust gas containing an acid gas to the absorption tower via a first heat exchanger and a water separator;
   an absorbent supply line configured to supply the absorbent which has absorbed the acid gas in the absorption tower to the recycling tower;
   a processed gas discharge line configured to supply a processed gas discharged from the recycling tower to a condenser via a third heat exchanger;
   a condensate supply line configured to supply condensate water generated in the condenser for recycling; and
   a mixed gas discharge line configured to externally discharge a mixed gas containing the acid gas and the absorbent from an upper part of the absorption tower via a fourth heat exchanger,
   wherein the absorbent supply line comprises a first absorbent supply line configured to supply a portion of the absorbent which has absorbed the acid gas to the fourth heat exchanger to perform heat exchange with the mixed gas of the mixed gas discharge line, and a second absorbent supply line configured to supply a remaining portion of the absorbent which has absorbed the acid gas to the recycling tower via a second heat exchanger.

2. The energy-saving acid gas capture system of claim 1, wherein the absorbent supply line configured to supply the absorbent which has absorbed the acid gas intersects with a recycled absorbent supply line configured to supply a recycled absorbent to the absorption tower via a reboiler connected to a lower part of the recycling tower at the second heat exchanger.

3. The energy-saving acid gas capture system of claim 1, wherein an operating temperature of the condenser is from about 30° C. to about 40° C.

4. The energy-saving acid gas capture system of claim 1, wherein the acid gas comprises carbon dioxide ($CO_2$), methane ($CH_4$), hydrogen sulfide ($H_2S$), carbonyl sulfide (COS), or mercaptane (RSH, wherein R is a hydrocarbon).

5. An energy-saving acid gas capture method using an absorption tower absorbing an acid gas with an absorbent and a recycling tower isolating a processed gas from the absorbent which has absorbed the acid gas, the method comprising:
   supplying an exhaust gas containing an acid gas to the absorption tower in order to absorb the acid gas with the absorbent;
   supplying the absorbent which has absorbed the acid gas, discharged from the absorption tower, to the recycling tower to separate the acid gas from the absorbent;
   supplying a processed gas discharged from the recycling tower to a condenser to isolate condensate water from the processed gas;
   supplying the condensate water generated by the condenser to a condensate supply line;
   supplying a portion of the absorbent which has absorbed the acid gas, discharged from a lower part of the absorption tower, to the recycling tower after heat exchange with a mixed gas discharged from an upper part of the absorption tower; and
   supplying a remaining portion of the acid gas-absorbed absorbent to the recycling tower after heat exchange with a recycled absorbent supplied from a reboiler.

6. The energy-saving acid gas capture method of claim 5, wherein an operating temperature of the condenser is from about 30° C. to about 40° C.

7. The energy-saving acid gas capture method of claim 5, wherein the acid gas comprises carbon dioxide ($CO_2$), methane ($CH_4$), hydrogen sulfide ($H_2S$), carbonyl sulfide (COS), or mercaptane (RSH, wherein R is a hydrocarbon).

* * * * *